United States Patent [19]

Muttoni

[11] Patent Number: 4,882,982
[45] Date of Patent: Nov. 28, 1989

[54] PERCOLATOR HOLDING PAN FOR ESPRESSO COFFEE MAKING MACHINES

[75] Inventor: Mario Muttoni, Frazione Cima, Italy

[73] Assignee: Spidem S.r.L., Milan, Italy

[21] Appl. No.: 105,130

[22] Filed: Oct. 6, 1987

[30] Foreign Application Priority Data

Oct. 8, 1986 [IT] Italy ................ 21942 A/86

[51] Int. Cl.$^4$ ............................... A47J 31/00
[52] U.S. Cl. ........................ 99/295; 99/299; 99/306
[58] Field of Search ............ 99/279, 283, 299, 295, 99/315, 300, 317, 304, 5, 6; 426/433

[56] References Cited

U.S. PATENT DOCUMENTS

| | | | |
|---|---|---|---|
| 2,338,140 | 1/1944 | States | 426/433 |
| 2,997,940 | 8/1961 | Pecoraro et al. | 99/315 |
| 3,333,527 | 8/1967 | Bender | 99/306 X |
| 4,189,991 | 2/1980 | Haddad | 99/302 R |
| 4,505,191 | 3/1985 | Longo | 99/305 X |
| 4,644,856 | 2/1987 | Borgmann | 99/295 |
| 4,667,587 | 5/1987 | Wunder | 99/299 X |
| 4,703,686 | 11/1987 | Siegfried | 99/300 X |

FOREIGN PATENT DOCUMENTS 3035157 4/1982 Fed. Rep. of Germany .
1367182 6/1964 France .

Primary Examiner—Harvey C. Hornsby
Assistant Examiner—K. O'Leery
Attorney, Agent, or Firm—Fleit, Jacobson, Cohn, Price, Holman & Stern

[57] ABSTRACT

A percolator holding pan for "espresso" coffee making machines enabling delivery of rich "espresso" coffee with a good flavor irrespective of the coffee powder conditions, such as its grinding grade, moisture content, and possibly the extent of its pressing. The pan comprises a body adapted for fitting to a delivery assembly of an "espresso" coffee maker, and a cavity formed in the body and having a bottom. A cupped percolator for the coffee powder is housed within the cavity. Two "espresso" coffee dispensing spouts are provided, and a liquid path extends through the body between the cupped percolator and the spouts and includes a compartment interposed between the cupped percolator and the bottom, as well as a pressure control provided in the path to control the pressure downstream of the cupped percolator.

17 Claims, 2 Drawing Sheets

PERCOLATOR HOLDING PAN FOR ESPRESSO COFFEE MAKING MACHINES

DESCRIPTION

This invention relates to a percolator holding pan for "espresso" coffee making machines, being of a type which comprises a body adapted for fitting to a delivery assembly of an "espresso" coffee making machine; a cavity formed in said body and having a bottom; a cupped percolator intended for holding the coffee powder and housed within said cavity; at least one "espresso" coffee dispensing spout; and a liquid flow path extending through said body between the cupped percolator and said at least one spout, and including a compartment provided at a location between said cupped percolator and said bottom.

As is known, to prepare a good, rich "espresso" coffee, the delivery time—i.e. the time required to complete the percolation process—and, hence, the flow rate, should be set at optimum values ensuring satisfactory results from the organoleptic standpoint.

Such values are directly dependent on the pressure of the water upstream of the coffee powder charge and the ground coffee size, since the coffee powder charge is bound to form a filtering element effecting upstream a pressure value which obviously reflect on the liquid coffee delivery rate.

It is a recognized fact that coarse grinding results in increased flow rate, and consequently shorter delivery time, whereas fine grinding leads to decreased flow rate, with longer delivery time as a consequence.

Note should be made that the flow rate value, for the same conditions of water pressure upstream of the filtering element formed by the coffee powder, is also tied to many other factors, such as the coffee variety being used, moisture content, ageing of the powder, pressing the powder within the cupped percolator, and a number of contingent weather factors which can change upon occasion and usually make adjustment rather problematical.

It should be further noted that the coffee delivery time, and therefore the rate at which it will be dispensed downstream of the percolator, are substantial to the obtainment of a rich "espresso" coffee with a fine flavor. In fact, too low a flow rate is apt to yield an "espresso" coffee with a thin head or "cream", dark colored and tasting bitter, commonly referred to as "burned" coffee, whereas an excessively high flow rate yields an "espresso" coffee having a weakly flavored pale colored head which make the "espresso" coffee more akin to an ordinary coffee infusion.

The aforementioned settings have been quite difficult to make heretofore, and have largely relied on the operator's skill, the operator being each time forced to adjust the coffee grinding, pressing, and the like settings until an optimum result can be obtained.

The problem underlying this invention is to provide a percolator holding pan of the type specified above, which has such constructional and operational features as to overcome the aforementioned shortcoming.

This problem is solved by a percolator holding pan as indicated being characterized in that it comprises pressure control means placed in said path for controlling the pressure downstream of the cupped percolator.

Said pressure control means advantageously comprise a restrictor effective to produce a pilot backpressure, and a shut-off valve located between the cupped percolator and the restrictor and being piloted by said backpressure.

Further features and the advantages of the percolator holding pan according to this invention will become apparent from the following detailed description of a preferred embodiment thereof, to be taken by way of illustration and not of limitation in conjunction with the accompanying drawings, where:

Figure 1:
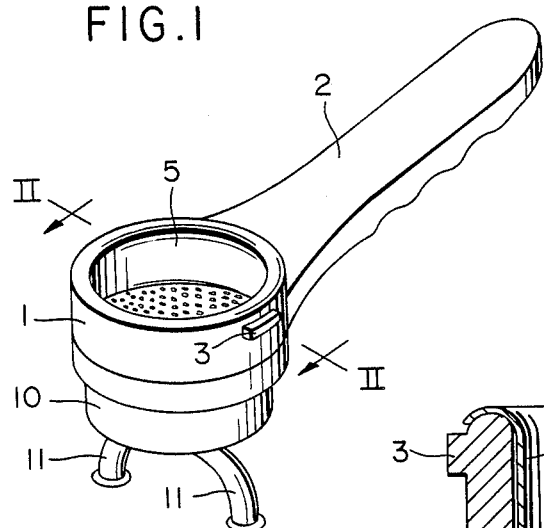
FIG. 1 is a perspective view of a percolator holding pan according to the invention.

With reference to the drawing figures, a percolator holding pan according to the invention comprises a body 1 which is formed with a handle 2 and bayonet coupling elements 3 for fitting to a delivery assembly of an "espresso" coffee maker.

The body 1 defines on its interior a cavity 4 adapted to accommodate a cupped percolator 5 to be loaded with a charge of coffee powder and which is acted upon by a ring seal 8 provided in the side wall of the cavity 4.

An underpan 10 having dispensing spouts 11 is connected to the bottom of the body 1.

The gist of the invention resides in that means of controlling the "espresso" coffee delivery pressure are provided at a port 20 which is formed through the bottom of the cavity 4 and puts the cavity in communication with the dispensing spouts 11.

These control means consist of a needle 21 formed at the tip with a conical termination 22 acting on the port 20 so as to control its working cross-sectional area. The needle 21 has, at a middle portion thereof, a ballasting body or weight 25 which is contained inside a compensation chamber, generally indicated at 26, which is defined between the bottom outside of the cavity and a deformable 30 defining an outlet port 31, in a middle portion thereof, which also functions as a lower guide member for the needle 21.

The deformable membrane is urged upwards by a spring 32 arranged to act between the cited underpan 10 and a central bulge 34 defined by the membrane and which forms, in its corresponding inward portion, the actual area accommodating the weight 25.

At the inward portion of the cited bulge 34, there are provided spacers 35 which serve as rest members for the weight effective to prevent it from fully blocking the outlet port 31. The compensation chamber should have extremely small volume dimensions in order to avoid unnecessary stagnation sites. To prevent the deformable membrane 30 from sticking to the outside bottom of the cavity defined by the body 1, under the thrust of the spring, slender ridges 36 are provided to hold the membrane off, thus affording small dimensions for the chamber. Further, such a minimized volume compensation chamber should have a pitched configuration toward the outlet hole in order to prevent formation of residues and stagnation sites for obvious sanitary considerations.

In addition, the spacers 35 will function as a stop for the weight 25, preventing it from blocking the inlet port 20 to the compensation chamber 26.

It stands to reason that the ports 20 and outlet ports 31 should be calibrated to control the flow with the utmost accuracy in order to provide the required delivery pressure on the occurrence of an excessively high flow.

It has been found in the course of actual tests that, where a pump with a 10-15 atm capacity is used for the coffee maker, the optimum diameter dimension of the port is within the range of 1.5 mm to 2.5 mm, with an 0.8-1.5 mm needle; the output port will then have a diameter equal to or smaller than that of the port 20.

Particularly in the inoperative condition, the needle 21 will leave the port 20 uncovered while throttling down the calibrated outlet port 31 defined in the membrane 30 with its calibrated stem.

The presence of the needle inside the two calibrated holes forming the port 20 and outlet port 31 affords self-cleaning of the two holes, in a simple manner upon loading and shaking out the coffee grounds, thereby ensuring perfect dimensional stability of the holes, and hence, correct performance over time.

To make an "expresso" coffee, water is admitted under pressure through the filter formed by the coffee powder, thereby a flow path of coffee percolate is formed leading into the compensation chamber through the hole 20. Should the flow prove excessive, i.e. the coffee be delivered within too short a time, the outlet hole 31, which is throttled down by the needle at the bottom of the compensation chamber, practically creates then a dynamic barrier effective to trigger a backpressure within said chamber which causes the membrane to become deformed by pushing it downwards against the bias of the springs 32.

The weight 25, allowed to rest on the membrane and rigid with the needle, will move down in consequence such that its conical tip 22 tends to cover the inlet port and throttle the flow further down, thus reducing the flow rate until a desire d flow rate is achieved.

Thus, the percolator holding pan affords control over the flow pressure in a virtually automatic manner because of the pressure established downstream of the cupper percolator on closing the port in the event that the flow of coffee proves to be too fast.

It should be added to the foregoing that a safety valve may be provided to relieve the pressure in the event that, for a reason whatever, excessively high internal pressures are crated.

Furthermore, provided in the bottom of the underpan 10 are drain holes 40 effective to prevent the formation of stagnant pockets of any kind.

Figure 4:
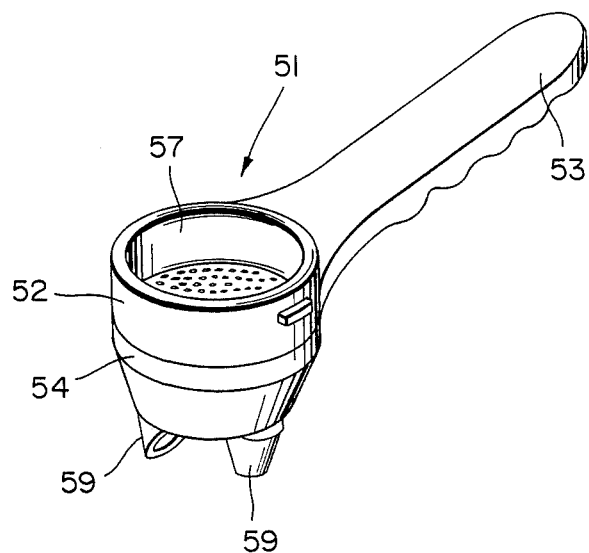
FIG. 4 is a perspective view of a modified embodiment of the percolator holding pan according to the invention.
Figure 5:
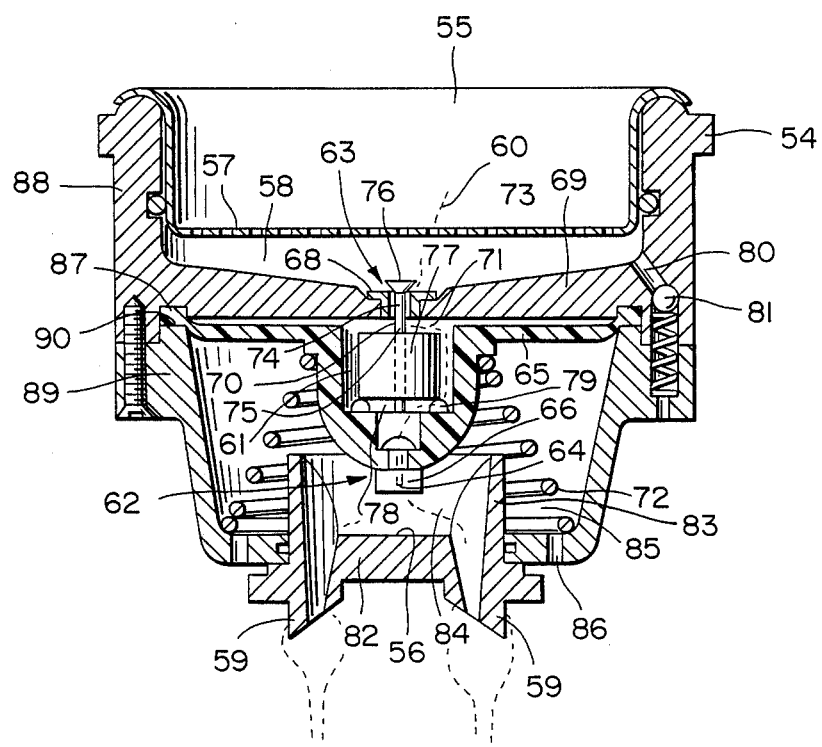
FIG. 5 is a sectional view of the percolator holding pan shown in FIG. 4, taken along the line V—V.

With reference to FIGS. 4 and 5, a percolator holding pan 51 according to the invention comprises an aluminum body 52 having a handle 53 and bayonet coupling elements 54 for fitting to a delivery assembly of an "espresso" coffee maker.

In the body 1, there is formed a cavity 55 having a bottom 56.

The cavity 55 accommodates a cupped percolator 57 for the coffee powder, which defines in said cavity 55 a compartment 58 formed between the cupped percolator and the bottom 56.

Two "espresso" coffee dispensing spouts, both indicated at 59, are provided on the body 52 at the bottom 56, thereby forming through said body 52 a liquid path, designated 60, which extends between the cupped percolator 57 and the spouts 59 and including said compartment 58.

The percolator holding pan 51 of this invention includes pressure control means 61 located in the path 60 for controlling the pressure downstream of the cupped percolator 57.

These pressure control means 61 comprise a restrictor 62, effective to produce a pilot backpressure, and a shut-off valve 63, interposed to the cupped percolator 57 and the restrictor 62 and being piloted by said backpressure.

The restrictor 62 has a calibrated port 64 formed through an elastically deformable membrane 65 lying in the compartment 58. More specifically, the calibrated port 64 is formed in a nozzle 66 of a non-sticking material removably push-fitted in the membrane 65 at a bulge 67 thereof.

The periphery of the membrane 65 is configured as a toric ring 87 whereby it is held in the body 52. To this end, the body 52 is formed in two juxtaposed parts 88 and 89, held together by screw fasteners and defining a seat 90 for said toric ring. The membrane will deform relatively to the toric ring, generating neither friction nor jerks.

Figure 2:
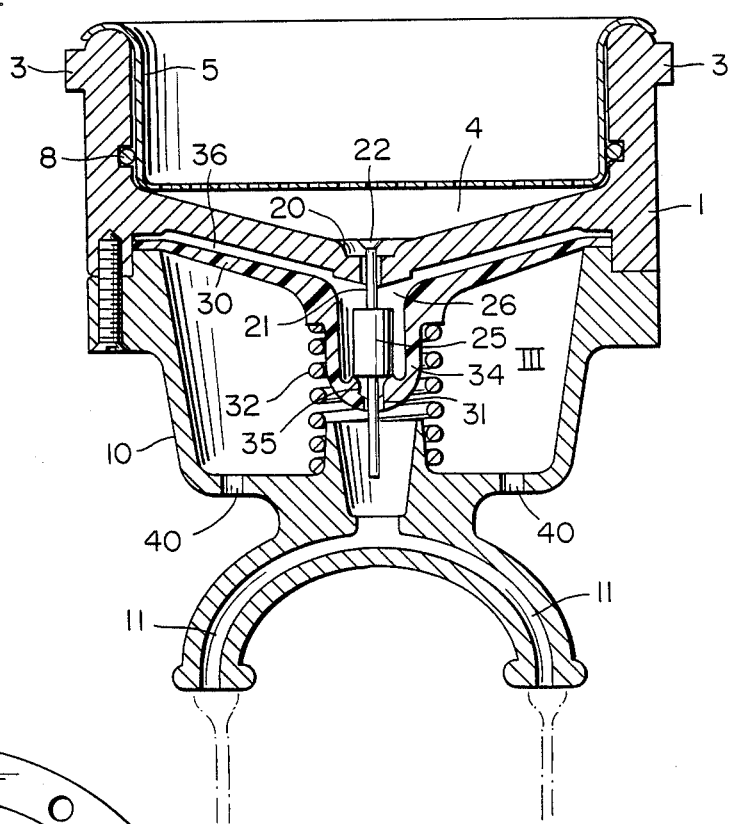
FIG. 2 is a sectional view of the percolator holding pan shown in FIG. 1, taken along the line II-II.
Figure 3:
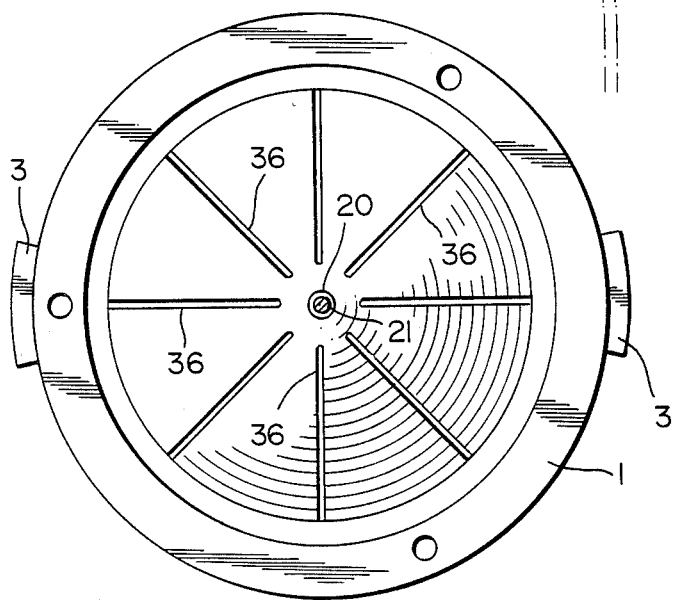
FIG. 3 is a detail view of the percolator holding pan shown in FIG. 1, taken in the direction of the arrow II.

The shut-off valve 63 includes a shutter seat 68, formed in a partition 69 provided in said compartment 58 between the cupped percolator 57 and the membrane 65, and a shutter 70, which is arranged to contact the membrane 65 and is movable toward and away from said shutter seat 68 by the action of said membrane. Partition 69 and membrane 65 may, if desired, both be provided with a frustoconical shape, similar to that of membrane 30 of FIG. 2, so as to be pitched respectively toward shutter seat 68 and calibrated port 64.

Formed between the partition 69 and the membrane 65 is a chamber 71 wherein said backpressure prevails and whose volume will change as the backpressure varies according to the extent by which the membrane is deformed.

It should be noted that a spring 72 is mounted between the membrane 65 and the bottom 56 to constantly bias the membrane 65 toward the partition 69.

Indicated at 73 are raised splines formed on the partition 69, which provide spacers effective to prevent the membrane 65 from resting across the entire surface of the partition 69 with the volume of the chamber 71 at a minimum, thereby preventing the membrane from sticking to the partition.

In particular, the shutter seat 68 would be formed preferably within an insert 74 of a non-sticking and non-rusting material, force fitted into said partition.

The shutter 70 comprises a needle 75 received through the shutter seat 68 and having frusto conical tip 76 mating with the shutter seat 68 to control the shutter passage cross-section.

The shutter 70 further comprises an enlargement 77, formed along the needle 75, which is seated in a seat 78 formed in the bulge 67. The enlargement 77 provides weight to hold the shutter 70 in contact with the membrane 65.

This contact is effected by engagement of the enlargement 77 with ridges 79 formed on the membrane.

From the path 60, at a location directly downstream of the cupped percolator 57 and upstream of the pressure control means 61, there branches off a conduit 80, formed in the body 52 and being open to the outside, in which a safety valve 81 is mounted.

The percolator holding pan 51 includes a plug 82, push fitted removably at the bottom 56, the spouts 59 being formed on said plug 82.

The plug 82 has a tubular portion 83 jutting into the compartment 58. The tubular portion 83 forms inwardly a collecting well 84, upstream of the spouts, and defines outwardly an annular groove 85 for receiving and centering one end of the spring 72, the other spring end being fitted over the bulge 67.

Said annular groove 85 is provided with drain holes 86 to prevent stagnation within the groove itself.

The diameter of the plug 82 should be selected for convenient access to the nozzle 66, removal and reassembling thereof.

The spouts 59 have their ends cut obliquely, to a so-called flute mouthpiece configuration, with diverging tips to hold the flows of "espresso" coffee issuing from the spouts well apart.

During the delivery of the "espresso" coffee, and for any grinding grade of the coffee powder or pressing thereof or the like, it has been found that delivery proceeds at nearly constant flow rate. This is owed to higher or lower flow rates than optimum immediately generating, in passing the restrictor 62, higher or lower backpressures, respectively, in the chamber 71, and accordingly, a larger or smaller displacement of the membrane 65 away from the partition. This results in the shutter being brought more or less close to the shutter seat. The net result is an increase or decrease of the pressure downstream of the cupped percolator which will prevail until the flow rate settles at the desired optimum value.

The main advantage of the percolator holding pan according to the invention resides in that it adjusts the flow rate of the delivered stream in an automatic manner, irrespective of the nature and state of the coffee powder being used, thus contributing toward optimum utilization of the coffee powder.

In other words, the use of the percolator holding pan according to the invention yields "espresso" coffee of excellent quality, without requiring application of any special skill or reiterated attempts at perfecting the coffee powder pressing operation as dictated each time by the coffee powder actually employed.

The percolator holding pan of this invention is also advantageous from the sanitary standpoint. In fact, all the "espresso" coffee will readily flow out of the percolator holding pan at each delivery. In all cases, it has proved easy and quick to clean out.

The holding pan of this invention is also advantageous from the standpoint of safety in use.

An additional advantage of the invention percolator holding pan is that its construction is simple and reliable, thereby affording flowless operation either following a number of successive deliveries or prolonged off cycles.

Lastly, it lends itself for use in lieu of a conventional one, to retrofit any "espresso" coffee maker whether of a professional or household type.

Understandably, several modifications and alterations may be applied to the percolator holding pans disclosed hereinabove, to meet specific contingent requirements, without departing from the protection scope of the invention as set forth in the appended claims.

I claim:

1. A percolator holding pan for "espresso" coffee making machines comprising: a body adapted for fitting to a delivery assembly of an "espresso" coffee making machine, said body including a cavity formed therein having a bottom; a cupped percolator for holding coffee powder and housed within said cavity; at least one "espresso" coffee dispensing spout; a liquid flow path extending through said body between the cupped percolator and said at least one spout, said cupped percolator and said bottom of said cavity forming a compartment therebetween; pressure control means placed in said path for controlling the pressure downstream of the cupped percolator, said pressure control means comprising a restrictor effective to bring about a pilot backpressure, and a normally open shut-off valve interposed between the cupped percolator and the restrictor and being piloted by said backpressure.

2. A percolator holding pan according to claim 1, characterized in that said restrictor comprises a calibrated port formed through a membrane extending in said compartment, and that said shut-off valve comprises a shutter seat formed in a partition provided in said compartment between the membrane and the cupped percolator and a shutter contacting said membrane and being movable toward and away from said shutter seat by the action of said membrane, between the membrane and the partition there being defined a variable volume chamber wherein said backpressure prevails.

3. A percolator holding pan according to claim 2, characterized in that said shutter comprises a needle received through said shutter seat and having a frustoconical tip (76) controlling the shutter passage cross-section.

4. A percolator holding pan according to claim 3, characterized in the said shutter includes an enlargement on the needle forming a weight effective to hold the shutter in contact with the membrane.

5. A percolator holding pan according to claim 4, characterized in that said needle extends through the calibrated port.

6. A percolator holding pan according to claim 5, characterized in that said partition (69) has raised splines forming spacers between the membrane and the partition when the chamber has minimal volume.

7. A percolator holding pan according to claim 6, characterized in that it comprises a spring arranged to keep the membrane constantly biased toward the partition 8. A percolator holding pan according to claim 7, characterized in that the partition and the membrane have both a frustoconical shape pitched respectively toward the shutter seat and the calibrated port.

9. A percolator holding pan according to claim 8, characterized in that the shutter seat is formed in an insert force fitted into said partition.

10. A percolator holding pan according to claim 9, characterized in that a nozzle of a non-sticking material is formed in said calibrated port and push fitted removably in said membrane.

11. A percolator holding pan according to claim 10, characterized in that it comprises a safety valve (81) placed in a conduit branching off said liquid path (60) upstream the pressure control means.

12. A percolator holding pan according to claim 11, characterized in that it comprises a plug with a preset diameter dimension and being push fitted at the bottom of the body, said plug being formed with the dispensing spouts.

13. A percolator holding pan according to claim 12, characterized in that said plug has a tubular portion jutting into the compartment and defining an annular groove for accommodating the spring.

14. A percolator holding pan according to claim 13, characterized in that said annular groove includes drain holes formed therein.

15. A percolator holding pan according to claim 14, characterized in that said spouts have their ends cut obliquely and diverging tips.

16. A percolator holding pan according to claim 15, characterized in that the membrane is formed with a toric ring around its periphery whereby the membrane can be retained in a seat defined in said body.

17. A percolator holding pan according to claim 16, characterized in that said body is formed in two juxtaposed parts screw-fastened together and defining said seat.

* * * * *